United States Patent [19]
Ma

[11] Patent Number: 6,056,248
[45] Date of Patent: May 2, 2000

[54] ALL DIMENSIONAL DISPLAY DEVICE

[76] Inventor: His-Kuang Ma, 4F, No. 48, Sec. 2, Chung Cherng Road, Taipei, Taiwan

[21] Appl. No.: 09/203,599

[22] Filed: Dec. 2, 1998

[51] Int. Cl.⁷ ...................................................... A47G 29/00
[52] U.S. Cl. ........................................ 248/124.1; 248/920
[58] Field of Search ............................. 248/124.1, 125.9, 248/184.1, 183.2, 183.3, 176.1, 176.3, 398, 415, 419, 919, 920, 923, 185.1, 921, 922; 361/681, 679, 680, 682, 683, 686

[56] References Cited

U.S. PATENT DOCUMENTS

| | | | |
|---|---|---|---|
| D. 319,435 | 8/1991 | Brown | D14/113 |
| D. 408,029 | 4/1999 | Rosen | D14/132 |
| 4,225,105 | 9/1980 | Nakamura | 248/184.1 |
| 4,437,638 | 3/1984 | Scheibenpflug | 248/183.2 |
| 4,438,458 | 3/1984 | Munscher | 348/838 |
| 4,834,329 | 5/1989 | Delapp | 248/183.3 |
| 5,016,849 | 5/1991 | Wu | 248/176.3 |
| 5,144,290 | 9/1992 | Honda et al. | 345/156 |
| 5,168,423 | 12/1992 | Ohgami et al. | 361/394 |
| 5,335,142 | 8/1994 | Anderson | 361/681 |
| 5,751,548 | 5/1998 | Hall et al. | 361/686 |
| 5,850,997 | 12/1998 | Rosen | 248/222.11 |
| 5,873,554 | 2/1999 | Nobuchi | 248/278.1 |

*Primary Examiner*—Ramon O. Ramirez
*Assistant Examiner*—David Heisey
*Attorney, Agent, or Firm*—Dougherty & Troxell

[57] ABSTRACT

An all-dimensional display device includes a base, a support, and a display. The base has one side provided with an opening at an intermediate portion thereof, with opposed holes formed on opposite sides that define the opening. At least one of the holes of the base accommodates a retaining element. The support has a width matching the length of the opening of the base and one end provided with pins projecting from both sides thereof. The pins are insertable into the holes of the base so that the support is pivotally turnable with respect to the base. The display includes a display board, a display screen, and a pivotal connecting element pivotally connecting the display to the support so that the display can turn forwardly and rearwardly as well as horizontally with respect to the support.

3 Claims, 3 Drawing Sheets

ALL DIMENSIONAL DISPLAY DEVICE

BACKGROUND OF THE INVENTION (a) Field of the Invention

The present invention relates generally to a display device, and more particularly to an all-dimensional display device adapted for use in cars.

(b) Description of the Prior Art

In recent years, computers have been adapted for use with cars, particularly in conjunction with the development of communications technologies. It is a trend to equip cars with navigation system and other network equipment. Audio and visual equipment, such as DVD, has also found application in cars.

Take the navigation system as an example. In addition to a reception device, it further requires a display device. If the car is seen as a semi-public space, that is, the car may carry passengers, then only the driver can look at the display. Apart from possibly endangering road safety, this is inconvenient for the passengers who cannot look at the display.

SUMMARY OF THE INVENTION

A primary object of the present invention is to provide an all-dimensional display device. According to the present invention, a preferred embodiment of the present invention comprises a base, a support, and a display. The base has one side provided with an opening at an intermediate portion thereof, with opposed holes formed on two opposite walls defining the opening. The support has an axial width corresponding to an axial length of the opening of the base. One end of the support is provided with respective pins projecting from both sides thereof for engaging the holes of the base so that the support is pivotally turnable with respect to the base. The display includes a display board, a display screen insertably disposed in the display board, and a pivotal connecting element that connects the display to the support so that the display can turn forwardly and rearwardly as well as horizontally with respect to the support.

BRIEF DESCRIPTION OF THE DRAWINGS

The foregoing and other features and advantages of the present invention will be more clearly understood from the following detailed description and the accompany drawings, in which.

DETAILED DESCRIPTION OF THE PREFERRED EMBODIMENT

Figure 1:
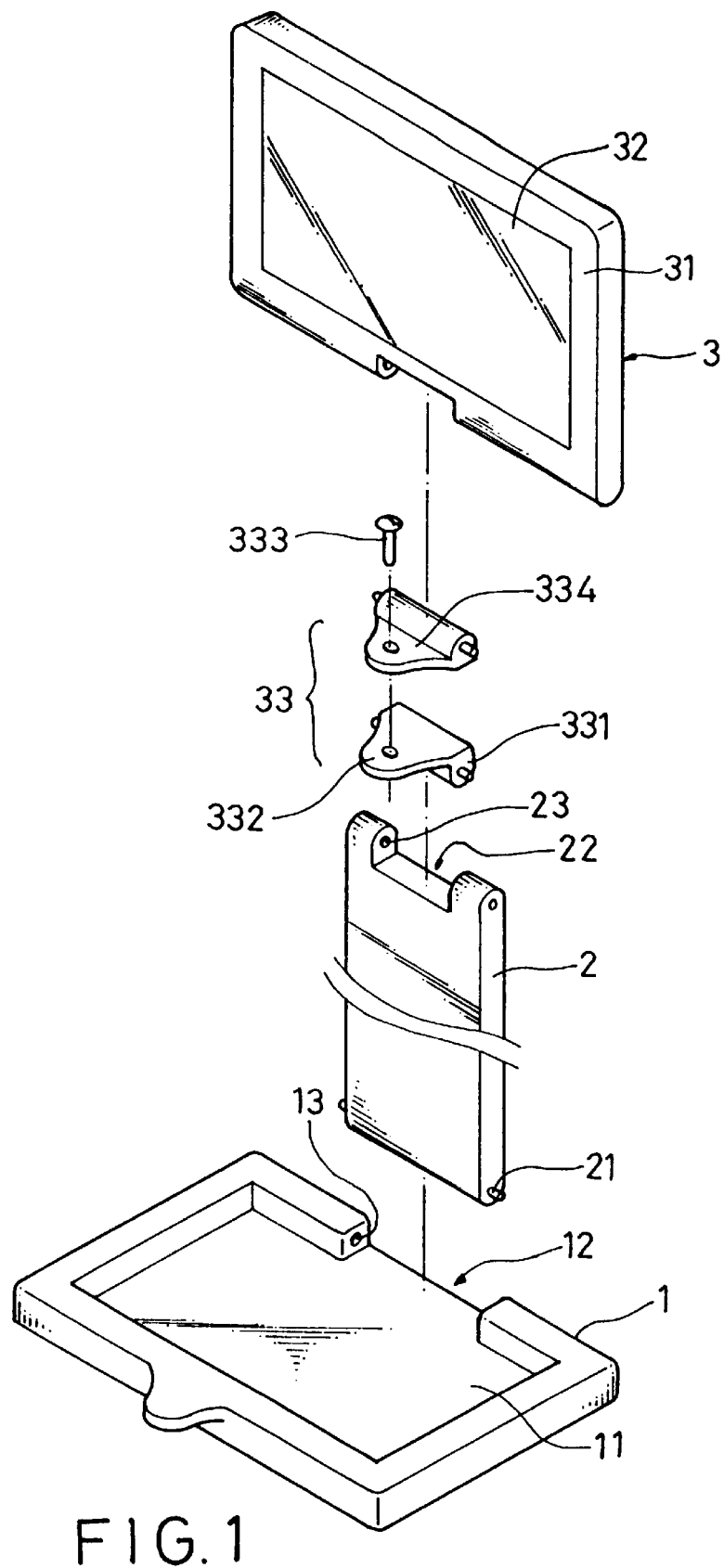
FIG. 1 is a perspective exploded view of a preferred embodiment of the all-dimensional display device according to the present invention.
Figure 2:
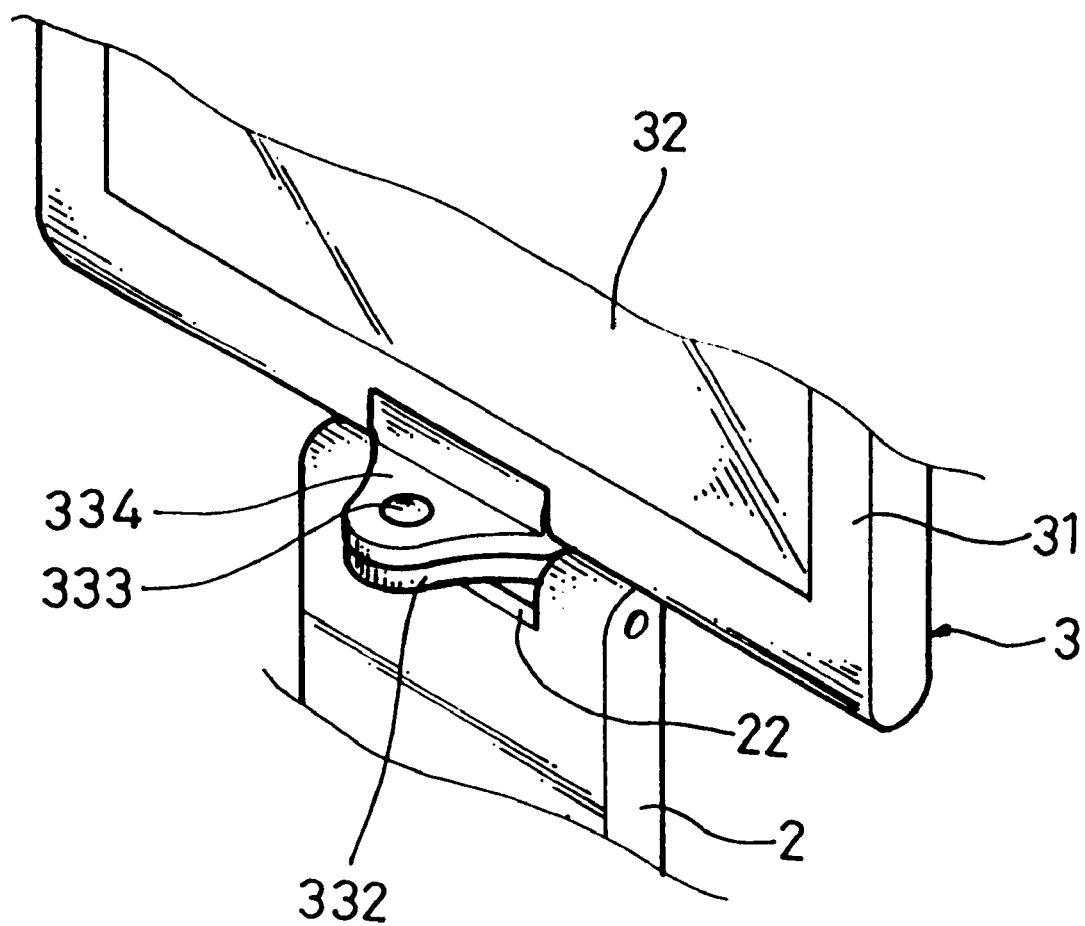
FIG. 2 is a schematic view of the preferred embodiment in part, showing a display and a support of the present invention.
Figure 3:
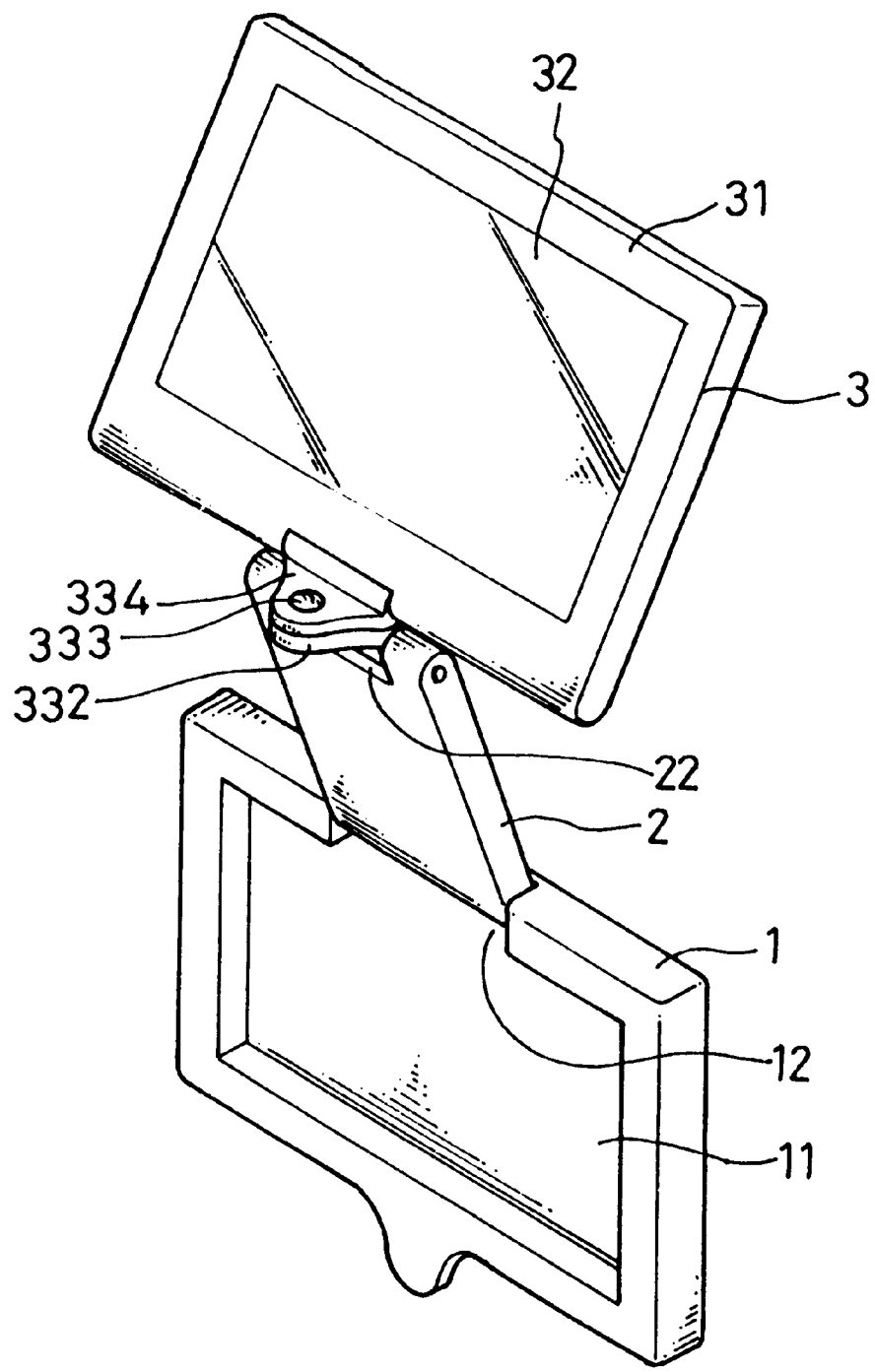
FIG. 3 is a perspective schematic view of the preferred embodiment of the present invention after assembly.

With reference to FIGS. 1–3, the preferred embodiment of a display device according to the present invention is shown to comprise a base 1, a support 2, and a display 3.

The base 1 may be a plate or a frame structure that is centrally formed with a base hole 11. If the base 1 is a plate, the base hole 11 may be a depression. If the base 1 is a frame, the base hole 11 may be a through hole. The base hole 11 is shaped and sized to match the display so that they can be engaged fittingly. As for the depth or thickness of the base hole 11, it corresponds to that of the support 2 and the display 3 so that the base hole 11 can be received therein after engagement therewith. In order that the base 1 and the support 2 can be connected, the base 1 is further formed with an opening 12 at a rear side thereof, with opposed holes 13 formed on opposite side walls defining the opening 12.

The support 2 is a frame structure which, as disclosed in the present invention, may also be a plate structure. One end of the support 2 is provided with pins 21 projecting from opposite edges thereof respectively to match the holes 13 of the base 1 so that the support 2 can be pivotally received in the opening 12 of the base 1 and turnable with respect to the base 1. The other end of the support 2 is provided with a support groove 22 at an intermediate portion thereof. Opposite walls of the support groove 22 are provided with respective support holes 23.

The display 3 includes a display board 31, a display screen 32 insertably disposed in the display board 31, a pivotal connecting element 33 connected to a lower end of the display board 31. As shown in FIGS. 1–3, the pivotal connecting element 33 includes a support pivot 331 having two ends that can be insertably received in the support holes 23. The support pivot 331 is connected to a support plate 332 extending therefrom. The support plate 332 is connected to a turning plate 334 via a turning axle 333. The turning plate 334 is secured to the display board 31. The display board 31 and the turning plate 334 are turnable with respect to the support plate 332, and the support pivot 331 is turnable with respect to the support 2 to thereby bring the display board 31 to turn therewith.

With reference again to FIGS. 1–3, when the present invention is adapted for use in a car, the base 1 is secured to one side of the driver's seat and, through the pivotal turning of the support 2 and the base 1, the height and position of the display 3 can be adjusted. And through the turning of the support pivot 331, the inclination of the display 3 can be adjusted. Further, through the action of the turning axle 332, the orientation of the display 3 can be adjusted. In this way, the display 3 can be turned in any direction to allow all the passengers in the car to look at.

To close the present invention, the support 2 is turned in a horizontal direction, and the display board 31 is also folded in a horizontal direction. In this way, the height of the present invention can be reduced, and the display board 31 can be accommodated in the base hole 11 of the base 1, so that the thickness of the present invention as a whole is substantially the thickness of the base 1.

The pivotal connecting element 33 of the present invention can be substituted by any equivalent means. For instance, the support holes 23 of the support 2 may be configured to be through support holes, and the two ends of the support pivot 331 can pass through the respective through support holes to achieve pivotal turning. Furthermore, the circuitry employed in the present invention is conventional and is not discussed in detail herein.

Although the present invention has been illustrated and described with reference to the preferred embodiment thereof, it should be understood that it is in no way limited to the details of such embodiment but is capable of numerous modifications within the scope of the appended claims.

What is claimed is:

1. An all-dimensional display device, comprising:
   a base having one side provided with an opening at an intermediate portion thereof, with opposed holes formed on two opposite walls defining said opening;
   a support having an axial width corresponding to an axial length of said opening of said base, one end of said support being provided with respective pins projecting from both sides thereof for engaging said holes of said base so that said support is pivotally turnable with respect to said base; and a display including a display board, a display screen insertably disposed in said display board, and a pivotal connecting element that connects said display to said support so that said display can turn forwardly and rearwardly as well as horizontally with respect to said support, wherein said pivotal connecting element includes a support pivot, a pivot plate connected to said support pivot, and a turning plate connected to said pivot plate, said turning plate being connected fixedly to said display, the end of said support opposite to that end provided with said pins being provided with a pivot groove at an intermediate portion thereof, with opposed support holes formed on two opposite side walls of said pivot groove, adapted for receiving two ends of said support pivot.

2. The all-dimensional display device as defined in claim 1, wherein said base is provided with a base hole for receiving said display.

3. The all-dimensional display device as defined in claim 1, wherein said base is a frame structure.

* * * * *